(12) United States Patent  
Locker et al.

(10) Patent No.: US 8,175,232 B2  
(45) Date of Patent: May 8, 2012

(54) PUSH VOICEMAIL VIA "ALWAYS ON"

(75) Inventors: Howard J. Locker, Cary, NC (US);  
James S. Rutledge, Durham, NC (US);  
James J. Thrasher, Efland, NC (US);  
Michael T. Vanover, Raleigh, NC (US)

(73) Assignee: Lenovo (Singapore) Pte. Ltd.,  
Singapore (SG)

( * ) Notice: Subject to any disclaimer, the term of this patent is extended or adjusted under 35 U.S.C. 154(b) by 1073 days.

(21) Appl. No.: 12/060,226

(22) Filed: Mar. 31, 2008

(65) Prior Publication Data

US 2009/0245485 A1    Oct. 1, 2009

(51) Int. Cl.  
*H04M 1/64* (2006.01)

(52) U.S. Cl. .................. 379/88.22; 379/88.18; 713/320; 711/105

(58) Field of Classification Search ............... 379/88.22, 379/88.18; 713/320; 711/105  
See application file for complete search history.

(56) References Cited

U.S. PATENT DOCUMENTS 7,240,228 B2 * 7/2007 Bear et al. ..................... 713/320  
2008/0244168 A1 * 10/2008 Warrier et al. ................ 711/105

* cited by examiner

*Primary Examiner* — Simon Sing  
*Assistant Examiner* — Van D Huynh  
(74) *Attorney, Agent, or Firm* — Ference & Associates LLC

(57) ABSTRACT

Solutions which address a growing and compelling need recognized in connection with rendering VOIP systems on laptops, or even on other mobile devices, even more versatile and user-friendly so as to even better replicate the advantages of cell phones. Broadly contemplated herein two modes of network access and two modes of user interface, which modes can be combined in any way as deemed suitable or appropriate. Preferably, a commonality between the contemplated network access and user interface modes is the use of a low-powered secondary processor, a secondary operating system, and non volatile storage applications which could be networking applications (e.g., an Always On subsystem).

18 Claims, 2 Drawing Sheets

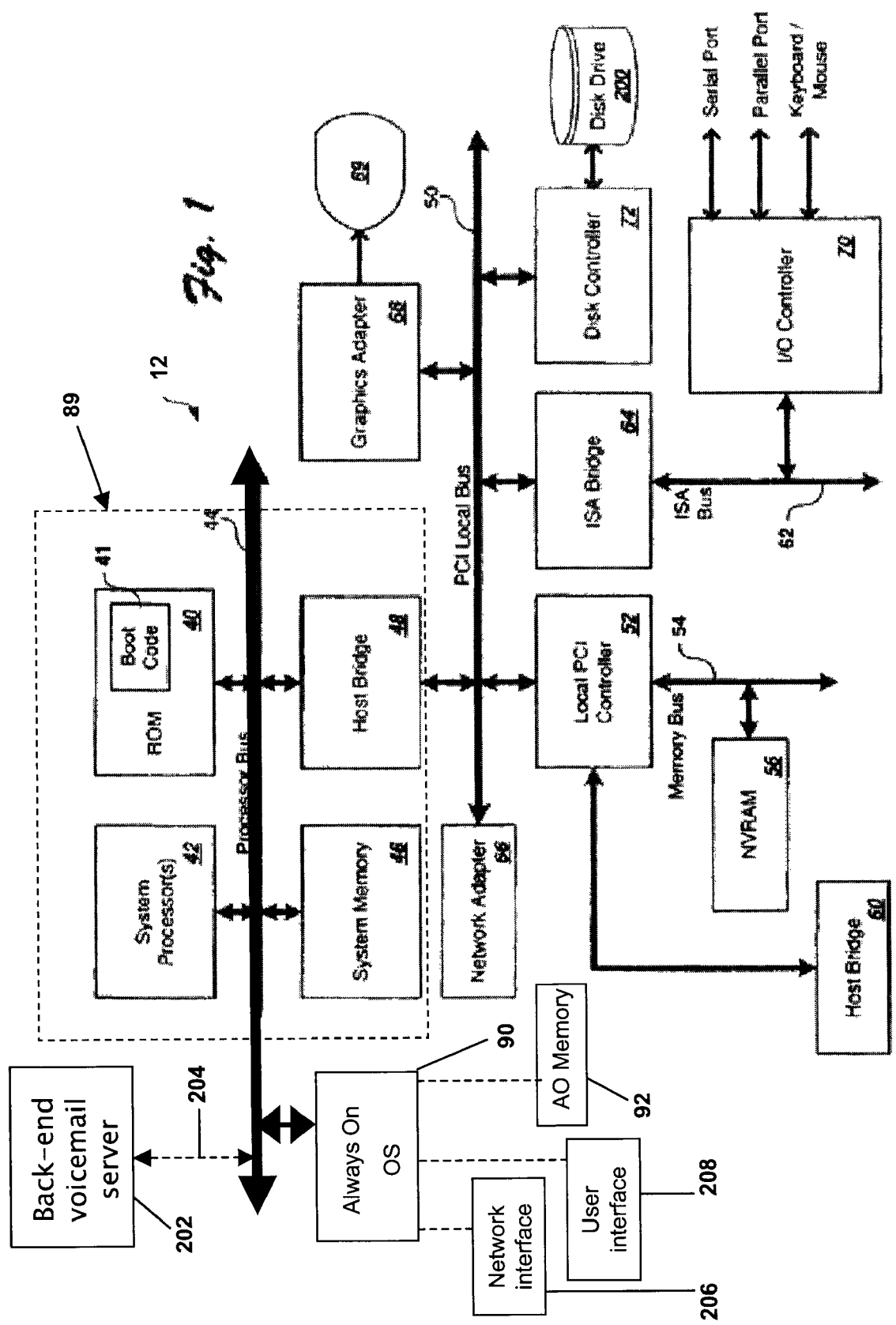

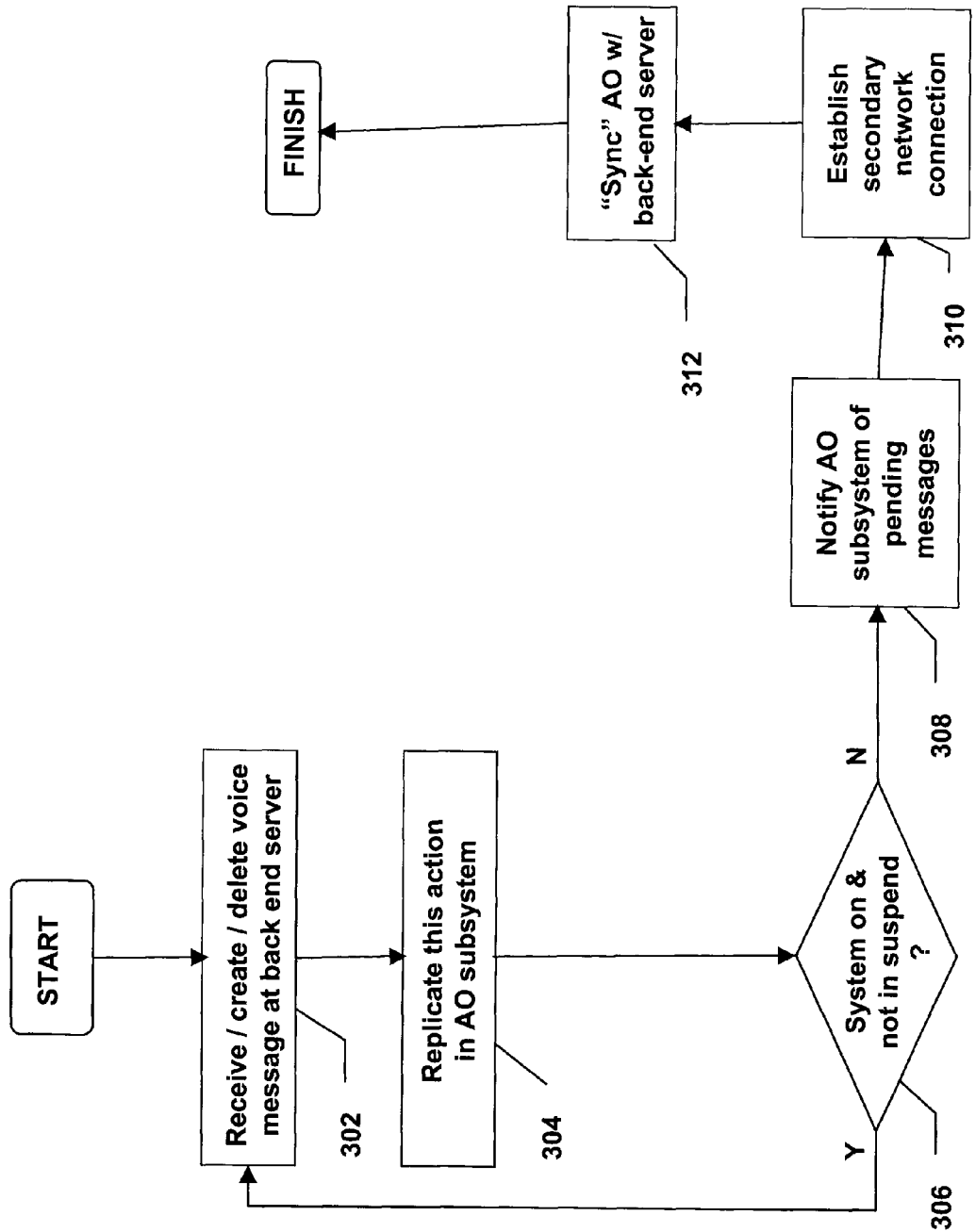

PUSH VOICEMAIL VIA "ALWAYS ON"

FIELD OF THE INVENTION

The present invention relates generally to notebook computers and the like, and to methods and arrangements for managing voicemail in such settings and in other settings.

BACKGROUND OF THE INVENTION

The use of VOIP (voice-over-internet-protocol) based phone systems has been increasing significantly. One advantage of such a system is the ability to run a "soft" phone client on a user's computer (and, most usefully, on a laptop or notebook) to forward voicemail traffic through the computer system from a PC voice application in such a way that it is functionally equivalent to the user's "hard phone", generally a land-line phone located, e.g., at an office location. In other words, the computer can not only act as a phone per se in realtime by use of a speaker and microphone associated with the computer, but can also receive and store voicemail whenever the computer is on.

A fundamental problem with this approach, however, is that laptops are typically disconnected much more frequently than cell phones and, as such, are normally not as versatile and handy as cell phones. For instance, a cell phone user can listen to locally recorded messages while the phone is disconnected, e.g., in an airplane while voice messages left via a computer voicemail server would be inaccessible. Accordingly, a computer "soft phone" is generally only useful when the laptop is open and operational. Once the lid is closed, the laptop normally "sleeps" or hibernates and cannot act as a phone at all, even to simply receive voicemail. Any calls received by a VOIP in the "back end", or away from the laptop, are not availed to the laptop at all until the laptop comes out of "suspend" or "hibernate" mode, makes a network connection (assuming one is available) and connects with the back-end VOIP server.

Thus, a growing and compelling need has been recognized in connection with rendering VOIP systems on laptops, or even on other mobile devices, even more versatile and user-friendly so as to even better replicate the advantages of cell phones.

SUMMARY OF THE INVENTION

Broadly contemplated herein are solutions which address the problems set forth above. Particularly, there are broadly contemplated herein two modes of network access and two modes of user interface, which modes can be combined in any way as deemed suitable or appropriate.

Preferably, a commonality between the network access and user interface modes broadly contemplated herein is the use of a low-powered secondary processor, a secondary operating system, and non volatile storage applications which could be networking applications (e.g., an Always On subsystem).

In summary, one aspect of the invention provides an apparatus comprising: a main memory; a first operating system in communication with the main memory; and a second operating system in communication with the main memory and the first operating system; a network interface arrangement which enables: communication between the first operating system and a voicemail server; and communication between the second operating system and the voicemail server; the second operating system acting to interface with the voicemail server responsive to a suspended state of the first operating system.

Another aspect of the invention provides a method comprising: managing voicemail with a first operating system, via a connection with a voicemail server; and managing voicemail with a second operating system, via a connection with a voicemail server, responsive to a suspended state of the first operating system.

Furthermore, an additional aspect of the invention provides a program storage device readable by machine, tangibly embodying a program of instructions executable by the machine to perform a method comprising: managing voicemail with a first operating system, via a connection with a voicemail server; and managing voicemail with a second operating system, via a connection with a voicemail server, responsive to a suspended state of the first operating system.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 schematically illustrates a computer system with added components.

FIG. 2 schematically illustrates a process for employing a secondary subsystem to handle voicemail.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

A "primary" or "main" operating system (OS) as normally employed by the system is indicated by the dotted box at 89 as normally encompassing components 40, 41, 42, 46 and 48, while, in accordance with a preferred embodiment of the present invention, a second OS can be embodied by an Always On Operating System (AO OS, or "AO"), indicated at 90, with its own memory, 92.

Further, a back-end voicemail server 202, as known, is preferably in communication with system 12 periodically via a network connection 204. In accordance with a preferred embodiment of the present invention, AO OS 90 preferably serves as a backup for enabling the accessing of voicemail messages when the system 12 is in a suspended state (e.g., a laptop lid is closed).

Normally, a standby state (often referred to as an "S3" state) equates to a complete system shutdown, except for memory. Thus, in an S3 or standby state (which terms will heretofore be used and can be understood interchangeably) the memory (e.g., system memory 46 in FIG. 1) remains coherent while other system elements are not. Such a state often prevails when, without actually shutting down a notebook system, a distinct physically act takes place such as the closing of the notebook lid. This state contrasts with what is commonly known as "S4", or "hibernate", and "S5", or "power off". S4/hibernate relates to a low battery state when, to avoid a degree of system corruption that might otherwise occur when battery power completely runs out, all open applications are rolled out to a file on the hard drive without being retained in system memory per se. S5 or power off, essentially, relates to complete system shutdown. S3/standby particularly contrasts with S4/hibernate in that the former normally involves a much faster resume time, e.g., when the lid is reopened; on the other hand, resuming a system from hibernation/S4 is typically a longer and more inconvenient process. Herein, the terms "S3" and "standby" and "suspend", and their derivatives, should be understood as being interchangeable with each other for the purposes of discussion, as should the pair of terms "S4" and "hibernate" (and their derivatives) as well as the pair of terms "S5" and "power off" (and their derivatives).

The AO 90 can be embodied by essentially any suitable operating system that is capable of functioning as described herein, e.g., a "WINDOWS CE" or "WINDOWS PE" system, or a "LINUX" system. The AO 90 can be provided in the form of a system card or in essentially any other suitable form, such as via components already in the computer (e.g., a portion of a hard drive).

As mentioned further above, there are broadly contemplated herein two modes of network access and two modes of user interface, which modes can be combined in any way as deemed suitable or appropriate. Preferably, a commonality between the network access and user interface modes broadly contemplated herein is the use of a low-powered secondary processor, a secondary operating system, and non volatile storage applications which could be networking applications (e.g., an Always On subsystem). It should be understood that the network interface in question is preferably independent of a network connection (e.g., 204) that might normally be utilized for connecting the system 12 to back-end server 202. (However, in an alternative embodiment, the system 12 and AO 90 could alternately use and reuse essentially the same network, as will be described further below.)

The "secondary" network interface, then, is indicated at 206 in FIG. 1 while the user interface is indicated at 208. Preferably, both of these may be associated with an Always On (AO) subsystem to be described in more detail herebelow, but it should be understood that essentially any type of secondary subsystem that is functionally equivalent to an AO system may be employed.

One contemplated mode of network access (at 206) is a WWAN (Wireless Wide Area Network) subsystem shared with a main computer processor and OS via a switching mechanism, such as via a BIOS (basic input/output system). Another contemplated mode of network access is via a tethered modem connection using an external device such as a "SmartPhone".

One contemplated mode of user interface (at 208) is a voice phone application running in the primary OS, e.g., as produced by Avaya, Inc. of Basking Ridge, N.J. Another contemplated mode of user interface is a wirelessly connected device with voice capabilities, such as a "BLUETOOTH" enabled cell phone.

As touched on hereinabove, conventional voice applications for laptops rely on a back-end server 202 to store voicemail messages. Accordingly, access to the messages requires a current network connection (204). Preferably, however, in accordance with a presently preferred embodiment of the present invention, a main OS voice application is modified such that it can store locally any voice messages to be sent, received, or conditionally redirected.

In this vein, referring now to FIG. 2, when a voice message is received or created at the back-end server (e.g., SIP), it will also preferably be stored in the AO subsystem (90 in FIG. 1); when deleted from the main OS voice application, the message will preferably also be removed from the AO subsystem. Accordingly, when an action of receiving, creating or deleting a voice message at the back-end server takes place (302), this is preferably replicated at the AO subsystem (304).

This will continue until the laptop goes into a suspended state (306), at which point the main OS voice application itself will be suspended. At this point, the AO subsystem will preferably be notified (308) of any pending outgoing messages (thereby eliminating the need to wait for messages to be sent in the main OS 89, FIG. 1). Thence, the AO subsystem may preferably "sync" with the back-end server via the AO's independent network interface (206 in FIG. 1). "Syncing" can take on any of a wide variety of suitable forms; generally, once the AO subsystem establishes a suitable network connection (that is operable outside of the suspended state of system 12, FIG. 1) (310), the AO subsystem will be able to send and receive messages through this connection (312) despite the main OS being unable to do so.

Preferably, during this "syncing" process (312), the user will be able to receive voice mail notifications through any number of mechanisms such as LED's (e.g., a light prompt) or SMS (short message service); this could be accomplished, e.g., via a "BLUETOOTH" connection between the system and a user's cell phone. Through essentially any suitable manner, while the computer system is in a suspended state, the AO subsystem may preferably reconnect periodically with the back-end server and, at such times, update the voice mail in the AO subsystem storage.

It should be appreciated that when the laptop next goes out of suspend mode, e.g., when the user reopens the laptop, the AO subsystem will have already updated the local voice mail box with messages, history and current status. Alternatively, the user can access this information at any time and continuously through a wireless connection to the suspended notebook using any wireless capability of the AO subsystem (e.g. "BLUETOOTH") and a compatible external device (e.g. a separate phone); this would be akin, e.g., to retrieving cell phone voicemail from another phone such as a land-line. In this case the user's experience will be as if they are using their cell phone as a hard phone connected back to their VOIP phone address.

If the laptop is WWAN-enabled and, e.g., a cell phone is not data plan-enabled in a particular part of the world, then the cell phone "BLUETOOTH", connected to the suspended notebook, could receive calls from a home country without employing long distance charges; the originating calls would simply be dialed in to a "home" VOIP number.

If a "BLUETOOTH" device or capability is attached to the AO subsystem, then it would even be possible to provide some measure of real time conversation as well as messages. The limitation would only be in the fidelity of the wireless devices with regard to sending and receiving "BLUETOOTH" audio in real time.

By way of further elaboration on the embodiments of the present invention as broadly contemplated herein, it will be appreciated that the embodiments of the present invention generally broadly embrace those systems and methods wherein there are two operating systems, and a second operating system acts to interface with a voicemail server responsive to a suspended state of a first operating system. Preferably, the first operating system will be a main OS of a computer while the second operating system will be an AO system that acts to communicate with an outside network when the main OS is in a suspended state (e.g., when a laptop lid is closed) and to the extent that a network connection of some type is available. The network connection, and the elements used to make the connection, may be different from or the same as a network connection used by the main OS.

Preferably, an AO may employ a WWAN (wireless wide area network) as a "back channel" for gaining a network link when the main OS is in a suspended state. Also contemplated for the purpose is a WiMAX (Worldwide Interoperability for Microwave Access) network, which is a telecommunications technology configured for providing wireless data over long distances. With a WWAN as a "back channel", essentially a cell phone network provides data access for the AO system.

While the AO may not always necessarily be network-connected when the main OS is in a suspend state, the AO may still serve a useful function. It can avail a user of the ability to, e.g., listen to locally stored voicemails and to record voicemails which can be stored and then sent as soon as a network connection becomes active.

To the extent that "BLUETOOTH" technology is contemplated herein for use with the embodiments of the present invention, this would simply allow the AO, while the main OS is in a suspended state, to freely communicate, e.g., with a mobile device such as a cell phone or personal data assistant. In this manner, e.g., the laptop lid can remain closed but the AO, while network connected, can still send data to a user's cell phone or other mobile device via the "BLUETOOTH" connection. In this manner, a user could use the cell phone or other mobile device to retrieve and/or send voicemails through the AO, and to be alerted of voicemail events (such as an incoming voicemail message), e.g., via an auditory or visual prompt at the cell phone or other mobile device. Preferably, the AO may include a "BLUETOOTH" radio for the purpose just described.

A variation on this would be if the "BLUETOOTH" radio of the AO is used to "piggy back" onto the data transmission capabilities of the user's cell phone or other mobile device. In other words, the AO would not need to use its own WWAN connection if the cell phone has one. Rather, the AO could use "BLUETOOTH" to communicate with the cell phone (or other mobile device) to use the cell phone's (or other mobile device's) WWAN connection. Thus, the AO could have two built in radios, that is, both WWAN and "BLUETOOTH".

In another manner of message notification, the AO card could preferably have a visual indicator for messages (LED's) or could have a medium affording SMS (text message) notification.

As mentioned further above, in accordance with variant embodiments of the present invention, the general system (12 in FIG. 1) and AO (90 in FIG. 1) could alternately use or reuse the same network connection interface. For instance, an AO card as broadly contemplated herein could well include network interface elements (e.g., 802.11 or WiMax) that would also be usable by the main processor of the system. This would eliminate the need for any type of complex switching arrangement that, e.g., would need to alternately switch between the AO card and one or more elements on, e.g., the motherboard of the system. Accordingly, in accordance with at least one presently preferred embodiment of the present invention, network interfaces as used by the AO and by the main system need not necessarily be separate and independent, but indeed could alternately employ the same elements.

It should be generally understood that, whereas examples in accordance with at least one embodiment of the present invention, as set forth hereinabove, have focused on the environment of a laptop or notebook, the battery management protocols broadly contemplated herein can of course be employed in a very wide variety of mobile device settings, such as with personal data assistants.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
    a main memory;
    a first operating system in communication with said main memory; and
    a second operating system in communication with said main memory and said first operating system;
    a network interface arrangement which enables:
        communication between said first operating system and a voicemail server; and
        communication between said second operating system and the voicemail server;
    said second operating system acting to interface with the voicemail server responsive to a suspended state of said first operating system;
    wherein said second operating system acts to functionally synchronize with the voicemail server during a suspended state of said first operating system, whereby said second operating system receives voicemail data from the voicemail server.

2. The apparatus according to claim 1, wherein said network interface arrangement comprises:
    a first network interface which enables communication between said first operating system and a voicemail server; and
    a second network interface which enables communication between said second operating system and the voicemail server;
    said second network interface being independently operable with respect to said first network interface.

3. The apparatus according to claim 1, wherein said first operating system comprises a primary operating system.

4. The apparatus according to claim 1, wherein said second operating system comprises an always on operating system with an additional memory.

5. The apparatus according to claim 1, wherein said apparatus comprises a laptop computer system.

6. The apparatus according to claim 1, wherein said second operating system acts to periodically receive voicemail data from the voicemail server during a suspended state of said first operating system.

7. The apparatus according to claim 1, wherein said second operating system acts to receive notification of pending outgoing mail responsive to a suspended state of said first operating system.

8. The apparatus according to claim 1, wherein said second operating system acts to receive replicated voicemail data from the voicemail server when said first operating system is not in a suspended state.

9. A method comprising:
    managing voicemail by a device with a first operating system, via a connection with a voicemail server; and
    managing voicemail by said device with a second operating system, via a connection with a voicemail server, responsive to a suspended state of the first operating system;
    wherein said managing with the second operating system comprises functionally synchronizing with the voicemail server during a suspended state of said first operating system, whereby the second operating system receives voicemail data from the voicemail server.

10. The method according to claim 9, wherein:
    said managing with a first operating system comprises managing voicemail via a first connection with a voicemail server; and
    said managing with a second operating system comprises managing voicemail via a second connection with a voicemail server, the second connection being independently operable with respect to the first connection.

11. The method according to claim 9, wherein the first operating system comprises a primary operating system.

12. The method according to claim 9, wherein the second operating system comprises an always on operating system with an additional memory.

13. The method according to claim 9, wherein the first and second operating systems are disposed in a laptop computer system.

14. The method according to claim 9, wherein said functionally synchronizing comprises the second operating system periodically receiving voicemail data from the voicemail server during a suspended state of said first operating system.

15. The method according to claim 9, wherein said managing with the second operating system comprises receiving, at the second operating system, notification of pending outgoing mail responsive to a suspended state of the first operating system.

16. The method according to claim 9, further comprising receiving, at the second operating system, replicated voicemail data from the voicemail server when the first operating system is not in a suspended state.

17. A program storage device readable by machine, tangibly embodying a program of instructions executable by the machine to perform acts comprising:
    managing voicemail with a first operating system, via a connection with a voicemail server; and
    managing voicemail with a second operating system, via a connection with a voicemail server, responsive to a suspended state of the first operating system;

wherein said managing with the second operating system comprises functionally synchronizing with the voicemail server during a suspended state of said first operating system, whereby the second operating system receives voicemail data from the voicemail server.

18. The program storage device of claim 17, wherein the second operating system comprises an always on operating system with an additional memory.

* * * * *